United States Patent [19]
Hale

[11] Patent Number: 6,160,919
[45] Date of Patent: Dec. 12, 2000

[54] METHOD FOR DATA COMPRESSION

[75] Inventor: Ira David Hale, Englewood, Colo.

[73] Assignee: Landmark Graphic Corporation, Houston, Tex.

[21] Appl. No.: 09/073,559

[22] Filed: May 6, 1998

Related U.S. Application Data

[60] Provisional application No. 60/045,915, May 7, 1997.

[51] Int. Cl.[7] .................................................. G06K 9/36
[52] U.S. Cl. ...................................... 382/250; 364/725.03
[58] Field of Search .................................... 382/268, 250, 382/246, 248, 109; 364/725.03

[56] References Cited

U.S. PATENT DOCUMENTS

| | | | |
|---|---|---|---|
| 4,754,492 | 6/1988 | Malvar | 382/41 |
| 5,021,891 | 6/1991 | Lee | 358/432 |
| 5,297,236 | 3/1994 | Antill et al. | 395/2.12 |
| 5,719,958 | 2/1998 | Wober et al. | 382/199 |
| 5,793,898 | 8/1998 | Nakamoto | 382/250 |

OTHER PUBLICATIONS

Bradley, J. N., C. M., and Hopper, T., 1993, The FBI wavelet/scalar quantization standard for gray–scale fingerprint image compression: Visual Information Processing II, SPIE Proceedings, 293–304. (ftp://ftp.c3.lanl.gov/pub/WSQ.).

Jawerty, B., and Sweldens, W., 1995, Biorthogonal smooth local trigonometric bases: J. Fourier Anal. Appl., 2. (http://cm.bell–labs.com/who/wim/papers/–papers.html).

Jawerth, B., Liu, Y., and Sweldens, W., 1996, Signal compression with smooth local trigometric bases: http://cm.bell–labs.com/who/wim/papers/–papers.html.

Malvar, H.S., and Staelin, D.H., 1989, The LOT—transform coding without blocking effects: IEEE Transactions on Acoustic, Speech, and Signal Processing, 37, No. 4,553–559.

Malvar, H.S., 1990, Lapped transforms for efficient rransform/subband coding: IEEE Transactions on Acoustic, Speech, and Signal Proceeding, 38, No. 6, 969–978.

Pennebaker, W.B., and Mitchell, J.L., 1993, JPEG still image data compression standard: Van Nostrand Reinhold.

Princen, J.P., and Bradley, A.B., 1956, Analysis/synthesis filter bank design on time domain aliasing cancellation: IEEE Transaction on Acoustics, Speech, and Signal Processing, 34, No. 5, 1153–1161.

Wickerhauser, M.V., 1994, Adapter wavelet analysis from theory to software: A.K. Peters.

Yeo, B., and Liu, B., 1995, Volume rendering of DCT–based compressed 3D scalar data: IEEE Transactions on Visualization and Computer Graphics, 1, No. 1, 29–43.

*Primary Examiner*—Yon J. Couso
*Attorney, Agent, or Firm*—Gary L. Bush; Mayor, Day, Caldwell & Keeton L.L.P.

[57] ABSTRACT

The widely used JPEG standard algorithm for two-dimensional image compression may be adapted for compression of arrays of any dimension and data type, specifically for arrays of seismic data. Because the JPEG algorithm processes, more or less independently, small subsets (8×8 blocks) of larger images or arrays of data, such adaptations are particularly useful in applications that cannot maintain a large, uncompressed, multi-dimensional array in computer memory. JPEG-like methods enable compression and decompression of large arrays by iteration over sub-arrays that are small enough to reside in memory. These algorithms lead to the concept of a compressed virtual memory. Special care must be taken in JPEG-like algorithms to avoid blocking artifacts, which are discontinuities between blocks of data that are compressed and decompressed independently. Fortunately, computationally efficient methods for suppressing these artifacts are well known. Of these methods, one has been adopted that enables much of the JPEG method to be reused. The JPEG-like method of the invention uses the JPEG methods for discrete cosine transform (although the forward and inverse transforms are reversed), and for Huffman encoding of the quantized transform coefficients. The method differs from JPEGs primarily in additional steps taken to avoid blocking artifacts, and in the quantization of transform coefficients.

6 Claims, 6 Drawing Sheets

METHOD FOR DATA COMPRESSION

RELATED APPLICATION

This application claims the priority of provisional application Ser. No. 60/045,915 filed May 7, 1997.

BACKGROUND OF THE INVENTION

1. Field of the Invention

The invention relates generally to data compression methods and in particular to an improvement of the JPEG method for image compression as it is applied to seismic data.

2. Description of the prior art

The JPEG standard algorithm for image compression (Pennebaker and Mitchell, 1993) consists of the following three steps, performed for each 8×8 block of pixels in a two-dimensional array:

1. Transform the 8×8 block of pixels, using a discrete cosine transform.
2. Quantize (scale and round) the transform coefficients into small integers.
3. Encode the bits, using few bits to represent the most frequent integers. The decompression algorithm inverts each of these steps, in reverse order. Both algorithms may be easily extended to compress and decompress arrays of any dimension.

FIG. 1 displays a 2-D array of seismic data that has not been compressed. The 2-D array of 32-bit floating-point numbers of FIG. 1 is a constant-time slice extracted from a 3-D seismic survey. FIG. 2 displays a zoomed subset of the same array.

FIG. 3 shows the same zoomed subset, after compression and decompression of the entire 3-D array using a JPEG-like algorithm. The compression ratio for the entire array is approximately 103:1, meaning that the original array of 32-bit floating-point numbers contained about 103 times as many bits as the compressed array.

For such large compression ratios, this JPEG-like algorithm produces the blocking artifacts visible in FIG. 3. At lower compression ratios, these discontinuities between blocks become less visible, but they may still be significant, particularly when further processing or interpretation is performed after decompression.

The artifacts in FIG. 3 are the result of each block of 8×8 samples being compressed and decompressed, independently, with no attempt to maintain continuity between the blocks.

In spite of these artifacts, the ability to compress and decompress such small subsets of data independently is a desirable feature. In particular, it enables access to some small part of a large compressed array, without decompressing the entire array. It also enables the compression algorithm to adapt to spatial variations in data amplitude and spectrum. These features are lacking in compression methods based on wavelet transforms (e.g., Bradley et al., 1993; Wickerhauser, 1994). The problem addressed in this application is to obtain these features, without the blocking artifacts.

One solution to this problem is to compress data using overlapping blocks, so that decompressed sample values can be computed without reference to values adjacent to block boundaries. This solution was used by Yeo and Liu (1995), in their adaptation of the JPEG algorithm to volume rendering of 3-D medical images. Unfortunately, the use of overlapping blocks increases the number of blocks to be compressed, which increases computation times and decreases compression ratios.

3. References to Prior Work Cited in this Specification

Bradley, J. N., C. M., and Hopper, T., 1993, The FBI wavelet/scalar quantization standard for gray-scale fingerprint image compression: Visual Information Processing II, SPIE Proceedings, 293–304. (ftp://ftp.c3.lanl.gov/pub/WSQ.)

Jawerth, B., and Sweldens, W., 1995, Biorthogonal smooth local trigonometric bases: J. Fourier Anal. Appl., 2. (http:H/cm.bell-labs.com/who/wim/papers/-papers.htnl).

Jawerth, B., Liu, Y., and Sweldens, W., 1996, Signal compression with smooth local trigonometric bases: http:flcm.bell-labs.com/who/wim/papers/-papers.html.

Malvar, H. S., and Staelin, D. H., 1989, The LOT - transform coding without blocking effects: IEEE Transactions on Acoustic, Speech, and Signal Processing, 37, no. 4, 553–559.

Malvar, H. S., 1990, Lapped transforms for efficient transform/subband coding: IEEE Transactions on Acoustic, Speech, and Signal Processing, 38, no. 6, 969–978.

Pennebaker, W. B., and Mitchell, J. L., 1993, JPEG still image data compression standard: Van Nostrand Reinhold.

Princen, J. P., and Bradley, A. B., 1956, Analysis/synthesis filter bank design based on time domain aliasing cancellation: IEEE Transaction on Acoustics, Speech, and Signal Processing, 34, no. 5, 1153–1161.

Wickerhauser, M. V., 1994, Adapted wavelet analysis from theory to software: A. K. Peters.

Yeo, B., and Liu, B., 1995, Volume rendering of DCT-based compressed 3D scalar data: IEEE Transactions on Visualization and Computer Graphics, 1, no. 1, 29–43.

4. Identification of Objects of the Invention

It is a primary object of the invention to provide an improved JPEG algorithm for data compression.

An important object of the invention is to provide an improved JPEG data compression algorithm which can be used to compress small subsets of data without blocking artifacts.

SUMMARY OF THE INVENTION

The invention is for a method of data compression which uses JPEG methods for discrete cosine transform and for Huffman encoding of the quantized transform coefficients. The method is an improvement over standard JPEG methods primarily in the additional steps to avoid blocking artifacts, and in the quantization of transform coefficients.

DESCRIPTION OF THE PREFERRED EMBODIMENT OF THE INVENTION

This invention is for an improved method of data compression based on blending data in adjacent blocks during compression with a JPEG-like algorithm. JPEG-like data compression has been described in various forms by many authors (e.g., Princen and Bradley, 1986; Malvar and Staelin, 1989; Malvar, 1990; Wickerhauser, 1994, Jawerth et al., 1995). The advantage of JPEG-like data compression is that it tends to increase compression ratios, and only slightly increases computation times.

Figure 1:
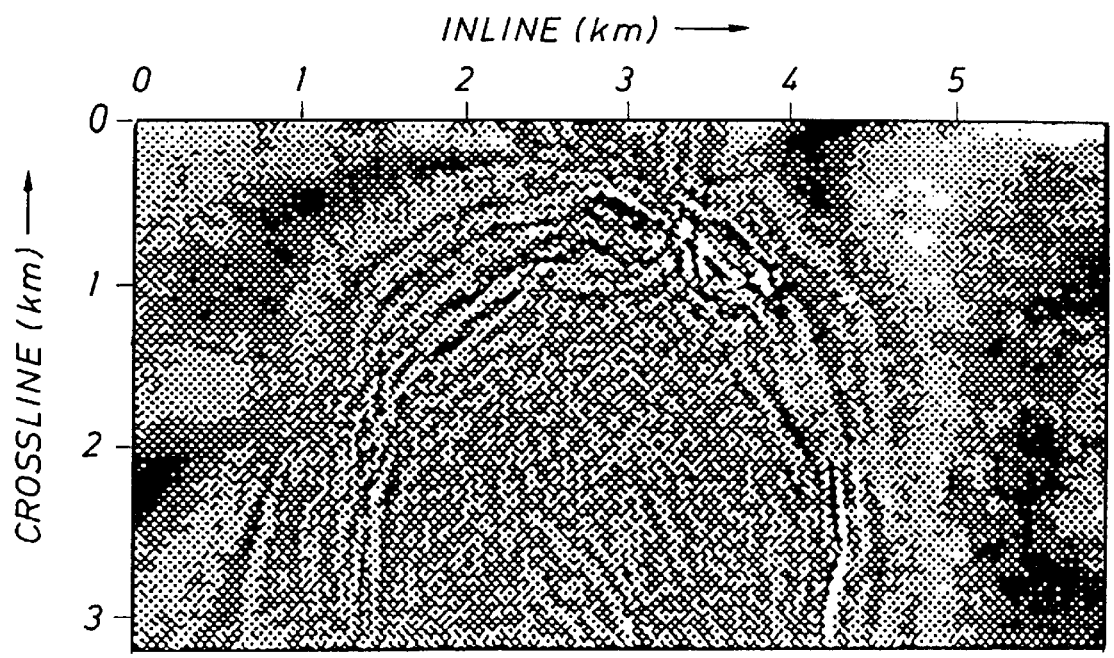
FIG. 1 represents a constant-time slice extracted from a 3-D seismic survey, where the display is a 3-D array of 32-bit floating-point numbers which has not been compressed.
Figure 2:
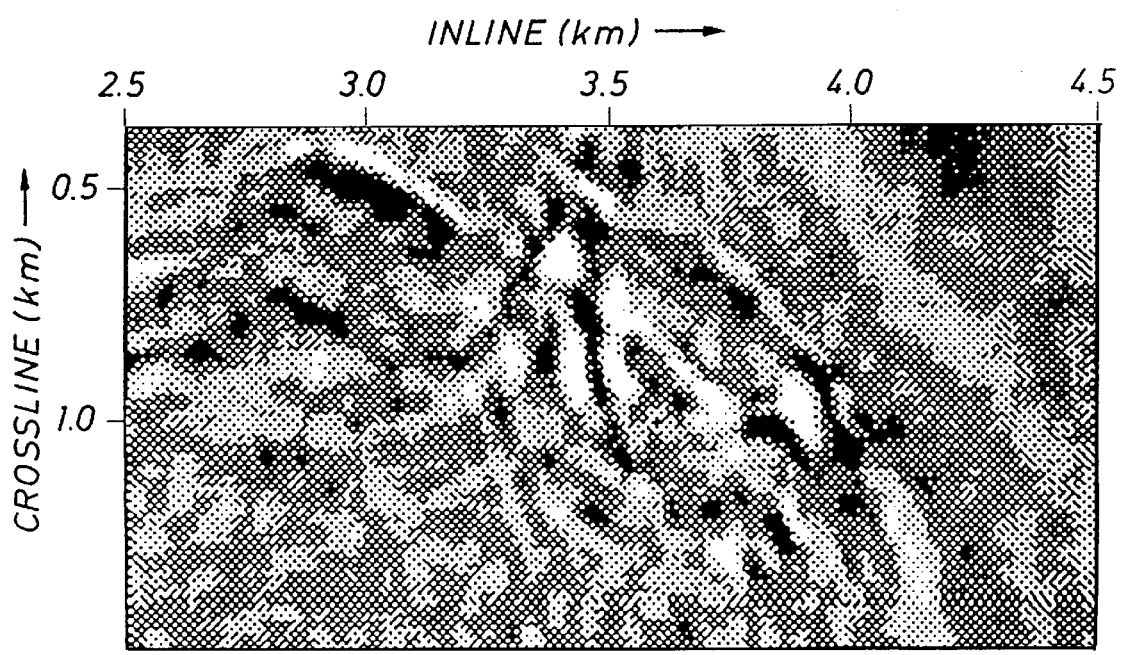
FIG. 2 is a zoomed subset of the 3-D array of FIG. 1.
Figure 3:
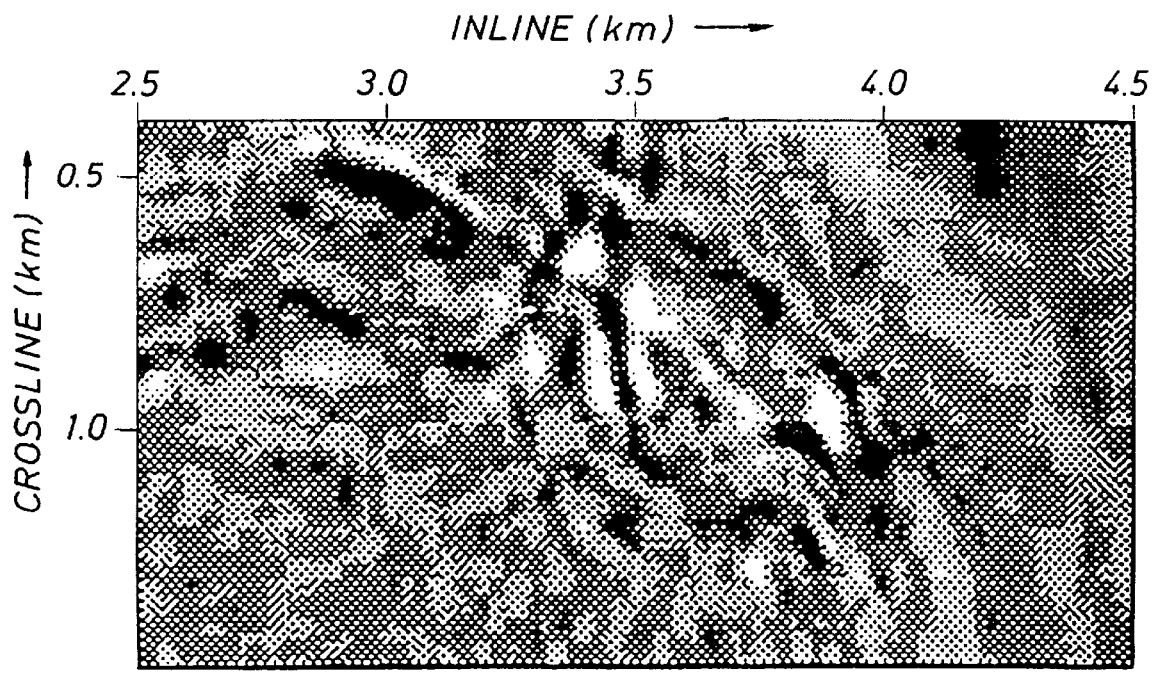
FIG. 3 shows data of FIG. 2 after compression and decompression via a straightforward adaptation of the JPEG algorithm, showing the blocking artifacts, the discontinuities between the 8×8 sample-blocks that were compressed independently.
Figure 4:
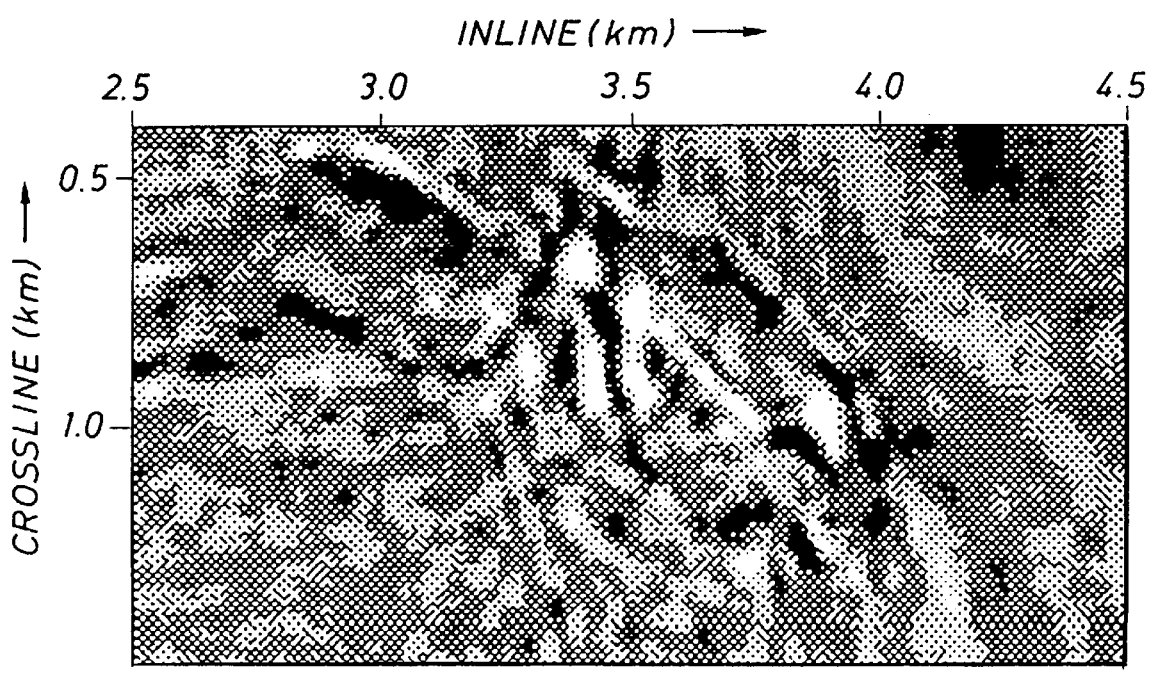
FIG. 4 shows the data of FIG. 2 after compression and decompression via a JPEG-like algorithm that has been designed to suppress blocking artifacts.

FIG. 4 displays the same subset from the 2-D array of FIG. 1, after compression and decompression using a second JPEG-like algorithm based on the method of the invention described below. The compression ratio for the entire array is approximately 112:1. Blocking artifacts in these decompressed data are absent.

The difference between the prior JPEG-like algorithms and the new JPEG-like algorithm according to the invention lies in a modification of the blocked discrete cosine transform specified in the JPEG standard. This modification in the algorithm of this attenuates blocking artifacts, while retaining the desirable features of the prior JPEG-like algorithm.

DISCRETE COSINE TRANSFORM

The transform used prior JPEG compression is a discrete cosine transform, called DCT-II. According to the invention, a different discrete cosine transform is used, called DCT-III. (For an enumeration of discrete cosine transforms, see Wickerhauser, 1994, p.84.)

DCT-III

The forward DCT-III is defined by $$z(k) = \sum_{j=0}^{M-1} y(j)b(j)\sqrt{\frac{2}{M}} \cos\left[\frac{\pi(2k+1)j}{2M}\right], \quad (1a)$$

$$k = 0, 1, \ldots, M-1,$$

and the corresponding inverse transform is $$y(j) = \sum_{k=0}^{M-1} z(k)b(j)\sqrt{\frac{2}{M}} \cos\left[\frac{\pi(2k+1)j}{2M}\right], \quad (1b)$$

$$j = 0, 1, \ldots, M-1,$$

where $$b(j) \equiv \begin{cases} \frac{1}{\sqrt{2}}, & j = 0, \\ 1, & \text{otherwise.} \end{cases} \quad (1c)$$

The forward and inverse transforms can be represented as matrix multiplications, as in $z=C_{III}y$ and $y=C_{III}^{-1}z$, where the matrix $C_{III}$ has elements $$C_{III}(k, j) = b(j)\sqrt{\frac{2}{M}} \cos\left[\frac{\pi(2k+1)j}{2M}\right]. \quad (2)$$

Figure 5:
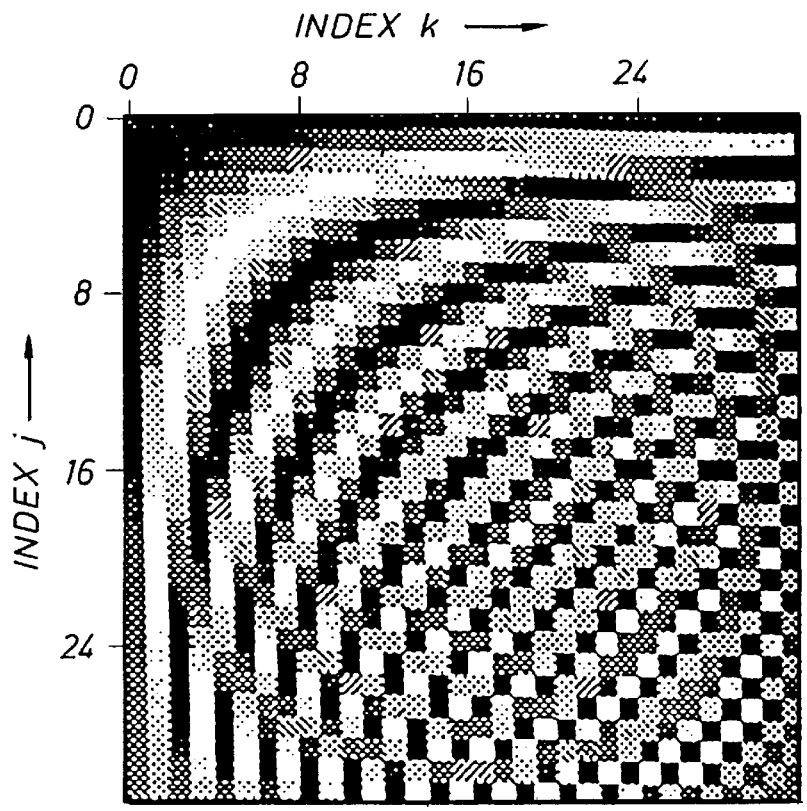
FIG. 5 shows a matrix $C_{III}^{-1}$ corresponding to an inverse DCT-III of length 32 where black pixels correspond to positive values; white pixels correspond to negative values.

The inverse transform matrix $C_{III}^{-1}$ is illustrated in FIG. 5, M=32. Any vector of 32 real numbers can be represented as a weighted sum of the columns of this matrix.

In a one-dimensional compression algorithm, a vector y of sample values might be approximated with only a few columns from the matrix $C_{III}^{-1}$ The weights for each column would be given by transform coefficients in the vector z. High compression ratios require that many of the coefficients in z are negligible, nearly zero. Such small coefficients will be quantized to zeros, which may be efficiently encoded using few bits.

The JPEG standard describes compression of two-dimensional images, not one-dimensional vectors. The prior DCT-II used in JPEG compression is a 2-D transform.

However, because the discrete cosine transform of multi-dimensional data may be performed as a cascade of 1-D transforms along each data dimension, only the 1-D transform is described for simplicity.

Blocked DCT-III

Figure 6:
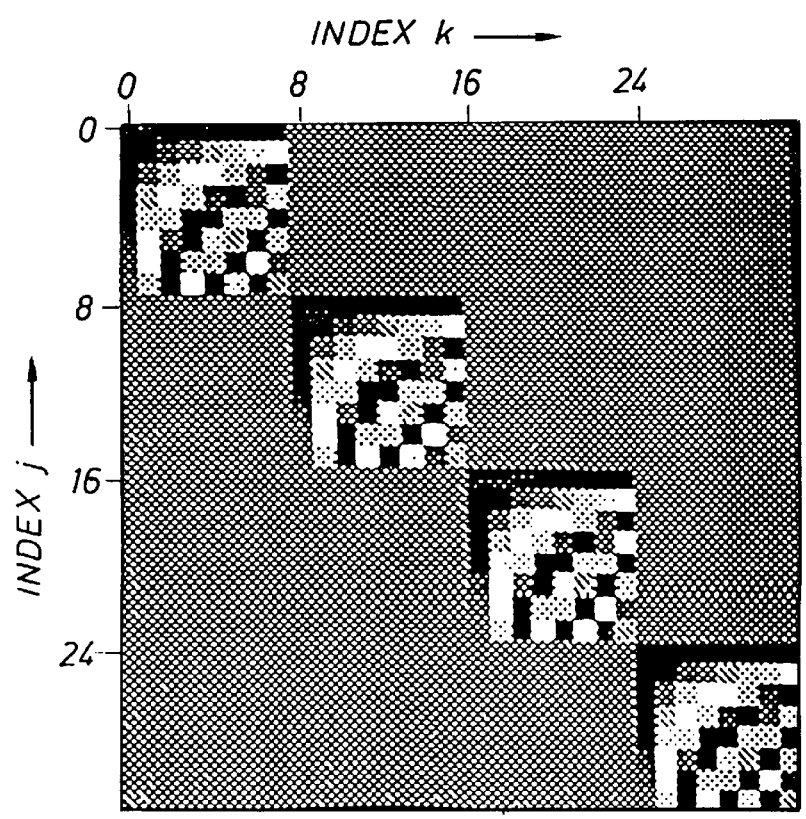
FIG. 6 shows a matrix corresponding to an inverse blocked DCT-III with block length 8.

For long data vectors, such as seismic traces, a single discrete cosine transform of the entire vector is unlikely to yield many transform coefficients that are negligible. Therefore, like JPEG, a blocked DCT is used, with transform length M=8, and pad data vectors are set to zeros, as necessary, to a length N that is a multiple of 8. The matrix corresponding to an inverse blocked DCT-III is illustrated in FIG. 6, for N=32 and M=8. Besides being more appropriate for compression, the blocked transform is also more efficient, with a computational cost that grows only linearly with the length N of data vectors.

Like the prior DCT-II used in JPEG compression, the DCT-III has several useful properties. First, a DCT-III transforms real numbers to real numbers, so that no complex arithmetic is required. Also, like the prior DCT-II, DCT-III is a unitary transform: $C_{III}^{-1} = C_{III}^T$. [This property is implied by equations (1) above.] The forward blocked DCT-III matrix corresponding to FIG. 6 is simply the transpose of the inverse blocked DCT-III displayed there.

Another useful property is that an inverse DCT-III is equivalent to a forward DCT-II:

$C_{III}^{-1} = C_{II}$. This relationship between the DCT-III and the DCT-II, and a choice of transform length M=8, enables use of the highly optimized DCT-II algorithms used in JPEG compression, by simply swapping the forward and inverse algorithms.

All of the properties cited above are useful, but why not simply use the prior JPEG's DCT-II! The answer lies in a modification according to the invention of the DCT-III to avoid the blocking artifacts caused by JPEG compression.

Figure 7:
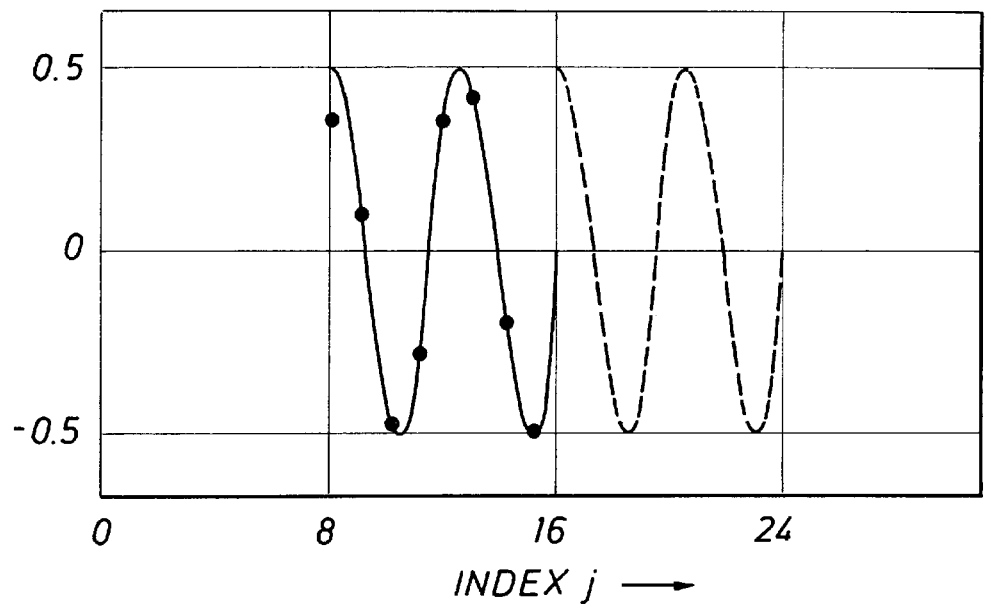
FIG. 7 shows columns 11 and 19 from the inverse blocked DCT-III matrix of FIG. 6, where the blocking artifacts in JPEG compression are caused by discontinuities such as that shown between samples 15 and 16, and the first sample in each cosine lies off the curve plotted and in this figure because of the discontinuity in the function b(j) defined by equation (1c) below.

Blocking artifacts appear when only a subset of the columns of the matrix shown in FIG. 6 is used in an approximation of a vector. Suppose, for example, that such a vector is highly compressed by using only two columns with indices k=11 and k=19. As illustrated in FIG. 7, any non-trivial combination of these two columns yields a discontinuity between sample indices j=15 and j=16 in the approximation. Such discontinuities create the blocking artifacts visible in images that have been compressed using the JPEG algorithm.

Folded DCT-III

Figure 8:
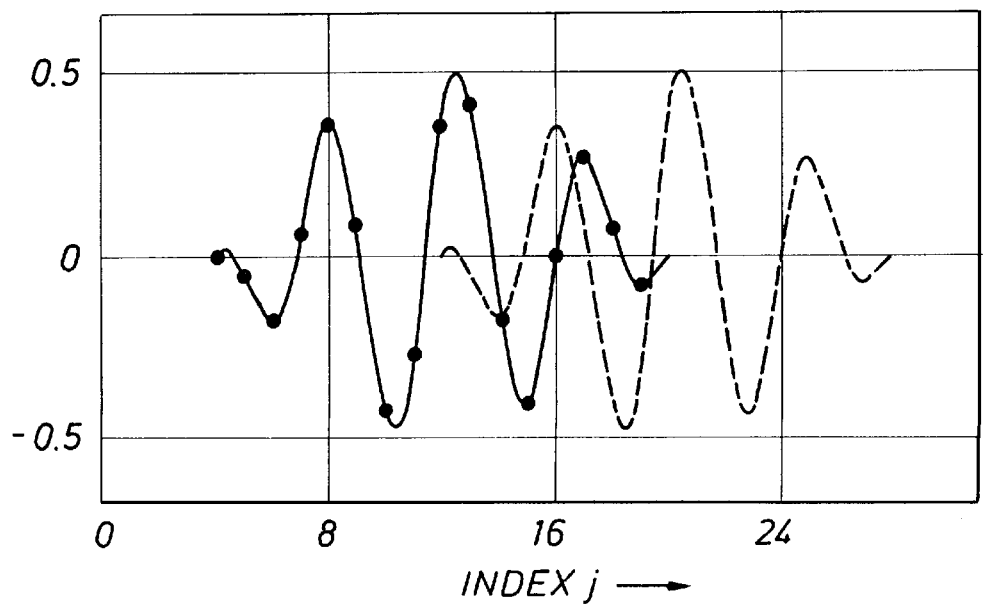
FIG. 8 shows smooth tapered cosines obtained by unfolding the truncated cosines displayed in FIG. 7 which are columns 11 and 19 of the inverse folded-DCT-III matrix of FIG. 9.

To avoid the artifacts caused by using a blocked DCT-III in compression, the blocked cosines illustrated in FIG. 7 is replaced with the smooth tapered cosines illustrated in FIG. 8. Compare the complete inverse transform matrix displayed in FIG. 9 with the inverse blocked DCT-III matrix of FIG. 6. The number of samples in each cosine has increased to 16 (except at the ends) so that cosines in adjacent blocks now overlap, and that each cosine smoothly tapers to zero. A weighted sum of these cosines will not produce the discontinuity shown in FIG. 7.

Figure 11:
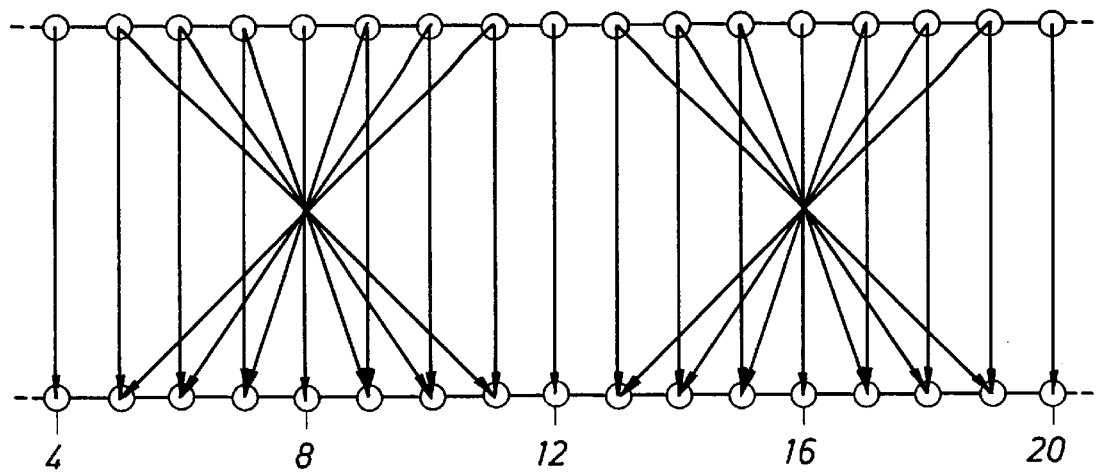
FIG. 11 shows an unfolding operation which is a pair-wise combination and replacement of sample values across DCT block boundaries and where folding is the inverse of this operation.
Figure 12:
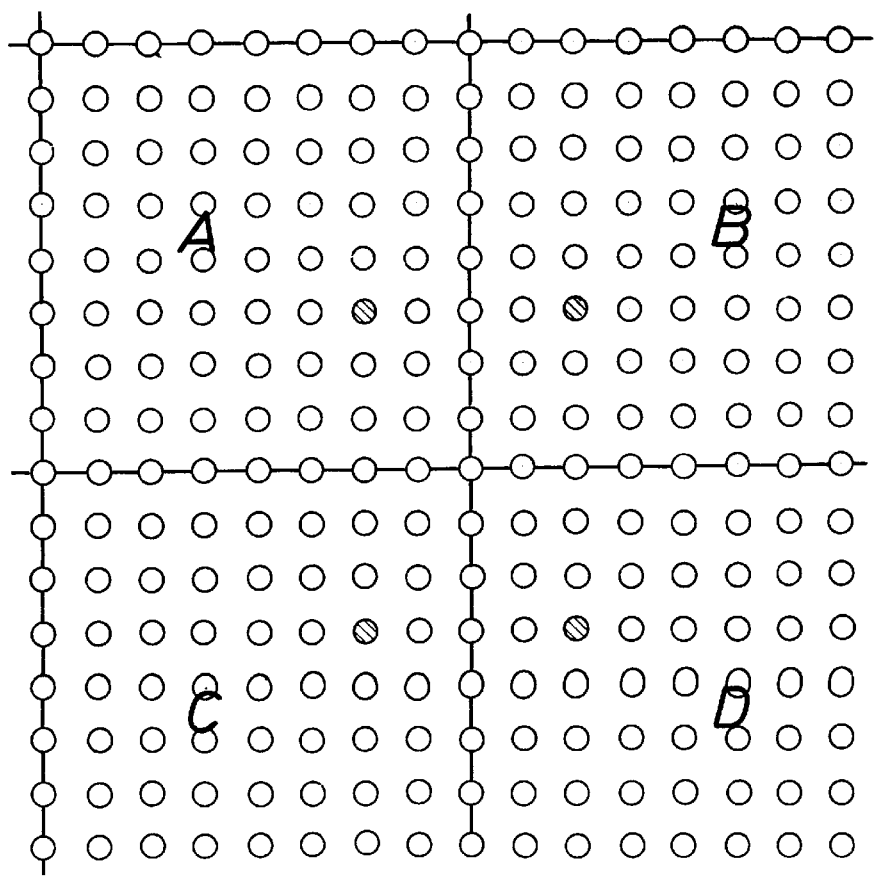
FIG. 12 illustrates the steps to decompress the highlighted sample in block A, which requires that one first decode, dequantize, and inverse DCT-III blocks A, B, C, and D, and then unfold the four highlighted samples where the folding and unfolding operations are a pair-wise mixing of samples across DCT block boundaries.

The transforms corresponding to these tapered cosines are often called local cosine transforms or lapped orthogonal transforms (Wickerhauser, 1994, p. 370; there is a similarity between FIG. 8 and Wickerhauser's FIG. 11.5). Here, these transforms are referred to as folded cosine transforms, to reflect the manner in which they are computed. Specifically, the transform used in the compression algorithm according to the invention is a folded-DCT-III. The inverse transform corresponding to the matrix shown in FIG. 9 is called an inverse folded-DCT-III.

Folding is a way to achieve smooth, tapered, 16-sample cosines using highly optimized, blocked, M=8 DCT algorithms. Wickerhauser (1994, p. 103), describes this method as "a remarkable observation made independently by several individuals", and goes on to discuss its application to compression. The folding operation used in compression in this invention is one of many described by Wickerhauser, but was inspired by the work of Jawerth and Sweldens (1995) and Jawerth et al. (1996). The latter authors discuss aspects of folding that are particularly relevant to compression.

Figure 9:
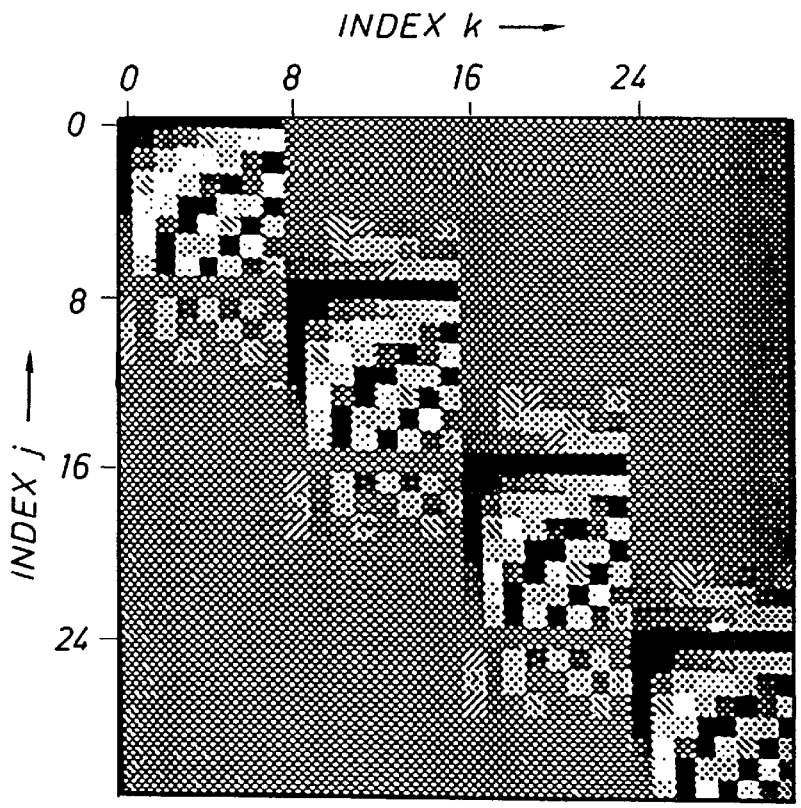
FIG. 9 shows a matrix corresponding to an inverse folded-DCT-III where the columns of this matrix overlap from block to block, with values that smoothly taper to zero such that weighted sum of these columns will not exhibit blocking artifacts.
Figure 10:
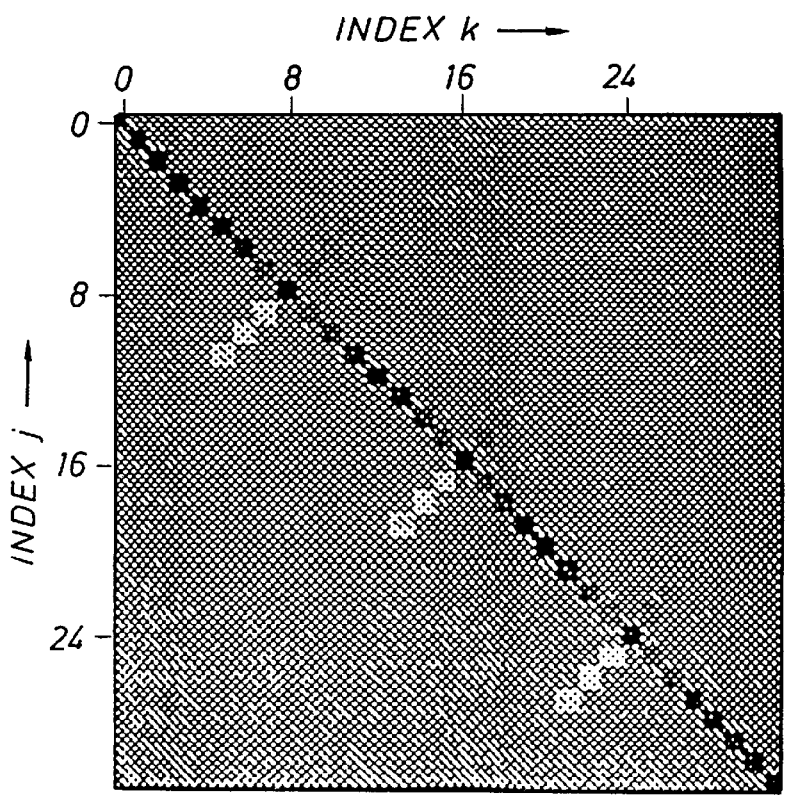
FIG. 10 shows a matrix corresponding to the operation used to unfold the inverse blocked DCT-III, where the matrix in FIG. 9 equals the product of this matrix and that displayed in FIG. 6.

The cleverness and efficiency of folding lies in the fact that the inverse folded-DCT-III matrix displayed in FIG. 9 is the product of an unfolding matrix, shown in FIG. 10, and the inverse blocked DCT-III matrix displayed in FIG. 6. Because each row and column of the unfolding matrix contains no more than two non-zero elements, the computational cost of unfolding is an almost insignificant addition to the cost of the inverse blocked DCT-III.

In practice, the matrices displayed in FIGS. 6, 9, or 10 are never actually constructed. Rather, operations are performed on sample values that have the same effect as multiplication by these matrices. For the inverse blocked DCT-II matrix of FIG. 6, this operation is the highly efficient forward blocked DCT-II algorithm used in JPEG compression. For the unfolding matrix of FIG. 10, this operation is a pair-wise mixing of sample values across the block boundaries at indices j=8, 16, . . . , as illustrated in FIG. 11.

The folding operation is simply the inverse of the unfolding operation, a different pair-wise mixing of the same sample values. Because folding and unfolding are centered about block boundaries, these operations are most concisely specified in terms of shifted sample values, which are defined by $y_l(j) \equiv y(lM+j)$. The symbol l is a block index and j is a sample-within-a-block index.

Then, folding is accomplished via $$y_l(j) = f(j)x_l(j) + f(-j)x_l(-j), \quad (3a)$$
$$y_l(-j) = f(j)x_l(-j) - f(-j)x_l(j),$$
$$l = 1, 2, \ldots, N/M - 1,$$
$$j = 1, 2, \ldots, M/2 - 1,$$
$$y_l(j) = x_l(j), \quad \text{otherwise,}$$

and unfold is accomplished via $$x_l(j) = f(j)y_l(j) - f(-j)y_l(-j), \quad (3b)$$
$$x_l(-j) = f(j)y_l(-j) + f(-j)y_l(j),$$
$$l = 1, 2, \ldots, N/M - 1,$$
$$j = 1, 2, \ldots, M/2 - 1,$$
$$x_l(j) = y_l(j), \quad \text{otherwise,}$$

where the folding function f(j) is defined by $$f(j) \equiv \sin\left[\frac{\pi}{4}\left(1 + \frac{2j}{M}\right)\right], \quad (3c)$$

The smooth tapered cosines in FIG. 8 and the matrix of such cosines in FIG. 9 were computed by applying equations (3b) to the columns of the matrix displayed in FIG. 6.

The forward folded-DCT-III of sampled values x(j) is determined by first computing y(j) via equations (3a), and then, for each block of 8 samples, computing z(k) via equation (1a). Likewise, the inverse folded-DCT-III is determined by first computing y(j) via equation (1b) for each block, and then computing x(j) via equations (3b).

As discussed by Wickerhauser (1994, p. 105), Jawerth and Sweldens (1995) and Jawerth et al. (1996), many alternative but similar folding operations are possible. The folding operation defined by equations (3) is chosen for two reasons.

First, the folding operation is unitary. The unfolding matrix shown in FIG. 10 is the transpose of the corresponding folding matrix (not shown). To verify this property, observe that the folding function of equation (3c) satisfies $f^2(j)+f^2(-j)=1$, and then express the folding and unfolding operations of equations (3a) and (3b) as multiplications by 2×2 matrices. Analytically invert the 2×2 folding matrix to see that its inverse equals its transpose, which equals the 2×2 unfolding matrix. The entire folding operation is therefore unitary, because it consists of these 2×2 mixings of sample values across block boundaries.

Second, the folding operation according to the invention ensures that a constant function, such as x(j)=1, yields transform coefficients $z_1(k)$ in each block that are non-zero for only k=0, thereby enhancing compression of constant (or slowly varying) data. In the terminology of Jawerth et al. (1996), the forward folded-DCT-III achieves "resolution of the constants".

To verify this second property of the folded-DCT-III, analytically apply the folding operation of equations (3a) to constant samples values $x_1(j)=1$, and verify that the result is $y_1(j)=\sqrt{M}C_{III}(0,j)$, where $C_{III}(k,j)$ is defined in equation (2). In other words, the folding function is chosen so that constant sample values are folded to precisely match (to within scale factor $\sqrt{M}$) the first (k=0) cosine of the DCT-III. Because this cosine is orthogonal to all other cosines of that transform, only the k=0 transform coefficient in each block will be non-zero after the forward folded-DCT-III. The value of each non-zero coefficient will be $z_1(0)=\sqrt{M}$.

More precisely, this property holds for all but the first and last blocks. Although resolution of the constants for the first and last blocks can be obtained by modifying the folding and unfolding matrices so that they are not unitary in their corners, less compression is accepted in these blocks and a strictly unitary folding and unfolding operation is maintained.

Comparison with DCT-II Algorithm used in JPEG Compression

The forward DCT-II used in JPEG compression achieves resolution of the constants without folding, because the first cosine of DCT-II (e.g., the first row of the matrix in FIG. 5) is constant. Indeed, this property is the reason why DCT-II, not DCT-III, is specified in the JPEG compression standard. Using the folding trick with DCT-II, might be considered, because folding before JPEG compression and unfolding after JPEG decompression might be performed, without modifying the standard JPEG algorithm.

Unfortunately, the folding and unfolding operations of equations (3) are not appropriate for DCT-II. Specifically, equations (3b) would not yield smooth tapered cosines, like those displayed in FIG. 8.

Jawerth et al. (1995) describe alternative folding and unfolding operations that are appropriate for DCT-II, and that maintain resolution of the constants. However, these operations are not unitary. They are in fact ill-conditioned, tending to amplify discontinuities in sample values that occur near block boundaries, and thereby reduce the efficiency of compression.

In contrast, the folding and unfolding operations of equations (3) are unitary, as are the forward and inverse DCT-III of equations (1). If F denotes the folding matrix, then the forward folded-DCT-III can be expressed as $z=C_{III}Fx$, and observe that $$z^T z = x^T F^T C_{III}^T C_{III} F x \qquad (4)$$
$$= x^T F^{-1} C_{III}^{-1} C_{III} F x$$
$$= x^T x$$
$$\sum_{k=0}^{N-1} z^2(k) = \sum_{j=0}^{N-1} x^2(j).$$

In other words, the sum of squared sample values after folded-DCT-III equals that sum before folded-DCT-III. This property may be used to estimate the distortion in decompressed data caused by quantizing the transform coefficients.

QUANTIZATION AND ENCODING

As described above, the transform used in the compression algorithm of the invention is just the inverse of that used in JPEG compression, but with folding included to reduce blocking artifacts. The quantization and encoding methods used are also adapted from those used in JPEG compression. The differences between the JPEG methods and the invention are described below.

Quantization

Because JPEG compression is intended for images, data before compression are either 8-bit or 12-bit values. (Color images are represented by red-green-blue triplets of such samples.) After a 2-D transform via DCT-II, 8-bit data may require up to 11 bits per sample, because the largest sample value after 2-D DCT-II is up to 8 times greater than that before the transform. In general, the largest sample value after DCT-II is up to $M^{D/2}$ times the largest value before transform, where D is the number of dimensions transformed. In other words, $$|z|_{max} 23 \, M^{D/2} |x|_{max}. \qquad (5)$$

This upper bound is achieved when the data exactly match one of the cosines used in the DCT-II, such as the constant first cosine $C_{II}(k=0,j)$.

The same factor $M^{D/2}$ also applies to the folded-DCT-III used in the compression algorithm of this invention. Therefore, after transforming 8-bit integer data with a folded-DCT-III, the method of the invention quantizes and encodes 11-bit integers in 2-D compression, and 13-bit integers in 3-D compression.

The quantization step in both the JPEG compression algorithm and the method of the invention is a scaling operation designed to reduce the number of bits to be encoded, and it is this reduction in the number of bits that is responsible for the distortion in data that are compressed and then decompressed. In such lossy compression methods this distortion is accepted in return for high compression ratios.

In JPEG compression, the transform coefficients within each block are quantized differently, with high wavenumbers (spatial frequencies) being represented with fewer bits than low wavenumbers. This wavenumber-dependent scaling in JPEG compression is usually optimized for human visual perception.

In the compression method of the invention, wavenumbers are all quantized equally. Errors are not introduced that are wavenumber-dependent. One reason for that is that for seismic data, there is often high interest in high wavenumbers. For example, subsurface faults imaged with seismic data correspond to high wavenumbers. Another reason is that seismic data are often analyzed by computer algorithms independent of the human visual system.

Local Quantization

When compressing 8-bit image data, sample values lie between −128 and +127; and it may be assumed that low-amplitude blocks of data are insignificant and may be safely quantized to zero during compression. The JPEG standard, in particular, makes this assumption, for it permits only one set of quantization scale factors for an entire image. As discussed above, these scale factors may vary for different coefficients (different wavenumbers) within a block, but the same set is used for every block. In this sense, JPEG quantization is global.

When compressing 32-bit floating-point data, it is preferred to perform a local quantization, with scale factors that vary from block to block. Before compressing such data, the maximum sample amplitude $|x|_{max}$ might not be known, and reading every sample before compression to determine this value may be costly. Furthermore, low-amplitudes may not be properly assumed to be insignificant; seismic data, in particular, often require considerable processing before this assumption is valid. Therefore, although a single scale factor is used to quantize all transform coefficients within a block, a scale factor may be permitted to vary from block to block. Specifically, in equation (5) above, $|z|_{max}$ denotes the maximum coefficient within each transformed block, and a different scale factor s is computed for each block.

Local quantization yields lower compression ratios (produces more bits-per-sample) than global quantization. An obvious reason is that additional bits are required to store the quantization scale factors for each block compressed. A less obvious reason is that local quantization may quantize fewer samples to zero than global quantization. Therefore, a choice of either local or global quantization is permitted in the compression algorithm of the invention.

The local quantization does not handle large dynamic range within a single block. For example, low-amplitude reflections in unprocessed seismic data may be hidden beneath high-amplitude surface waves. Within blocks contaminated with high-amplitude noise, the compression algorithm of the invention, even with local quantization, may quantize low-amplitude signal to zero, so that the signal could not be recovered by processing after decompression. Therefore, high-amplitude noise should be attenuated before compression.

Compressed Virtual Memory

Virtual memory presents the illusion of a memory larger than that physically available. This illusion is most effective for applications that tend to access data located near other data that were recently accessed. Such applications have good locality of reference.

Applications working with 2-D or 3-D arrays often exhibit good locality of reference. For example, a seismic interpretation application may display consecutive 2-D slices of data from a 3-D array. With a sufficiently fast, local decompression algorithm, blocks may be decompressed containing the samples for such slices on demand, without decompressing the entire 3-D array. The compression algorithm of the invention is especially useful in such applications.

Key to such applications is the ability to compress or decompress a subset of a large array, without compressing or decompressing the entire array. For compression based on a blocked DCT-II, like that used in JPEG compression, this feature comes easily. Specifically, to decompress a single sample, it is only necessary to decode, dequantize, and inverse DCT-II the block containing that sample. Once decompression for one sample is accomplished, decompression of all of the samples of its block is accomplished. Assuming locality of reference, the computational cost of decompressing the other samples in that block will not be wasted.

For the compression algorithm of the invention, based on a folded-DCT-III, some additional work is required. Consider 2-D compression and the four blocks of 8×8 samples illustrated in FIG. (12). In order to decompress the sample corresponding to the filled circle in block A, it is required to (1) decode, dequantize, and inverse DCT-III all four blocks (A, B, C, and D), and (2) unfold the four samples corresponding to the filled circles. The unfolding across block boundaries is just as illustrated in FIG. 11 and described by equation (3b), performed first for one dimension and then for the other. Although four blocks are required, once decompression of the sample in block A is accomplished most of the work necessary to decompress neighboring samples has been performed. Again, assuming locality of reference, this additional computation will not be wasted.

Another difference between the quantization step of the invention and JPEG's stems from our need to quantize 32-bit floating-point data, which have a much larger dynamic range than 8- or 12-bit image data. To quantize a floating-point value z into an integer i with B+1 bits (including a sign bit), the following algorithm is used $$i = \begin{cases} \lfloor z \times s + 1/2 \rfloor, & z \geq 0, \\ \lceil z \times s - 1/2 \rceil, & z > 0, \end{cases} \quad (6)$$

where s is the quantization scale factor. To avoid overflow, $|i|<2^B$ is required. This restriction and equation (6) lead to the following equation for the scale factor:

$$s = \frac{(2^B - 1/2)(1 - \epsilon)}{|z|_{max}} \quad (7)$$

where $\epsilon$ is float-epsilon, the smallest positive number that can be subtracted from 1, using floating-point arithmetic, to obtain a number not equal to 1.

Huffman Encoding

The JPEG compression standard permits two methods for encoding the integers produced by quantization—Huffman coding and arithmetic coding—and many other encoding methods are possible. The JPEG's Huffman encoding is used in the compression algorithm of the invention, because it is computationally fast, is simple to implement, and is freely available.

With one exception, the Huffman encoding and decoding algorithms follow the JPEG specification. The JPEG standard specifies special encoding of the DC (k=0) transform coefficients. JPEG compression exploits the fact that these DC coefficients are often highly correlated among neighboring blocks. This special treatment is not used in the method of the invention, for two reasons: (1) it introduces block-to-block dependencies that complicate compression and decompression of single blocks, and (2) seismic data typically have relatively small DC coefficients. (Although small, the DC coefficients are seldom negligible, because of the short M=8 transform used.) Therefore, the DC coefficient is encoded just as the other (AC) coefficients are encoded.

LOCAL COMPRESSION

The primary advantage of a JPEG-like algorithm is that part of a multi-dimensional array can be compressed or used without processing all of it. In contrast, compression algorithms based on wavelet transforms (e.g., Bradley et al., 1993; Wickerhauser, 1994) lack this feature. While the JPEG standard does not explicitly support this feature, the blocked DCT-II used in JPEG compression makes it feasible. This capability is exploited in the compression algorithm of the invention based on a folded-DCT-III.

Each block of data in an array may be thought of as analogous to a page of virtual memory. For 2-D compression, each page would contain 64=8×8 samples; for 3-D compression, each page would contain 512=8×8×8 samples. Samples are decompressed as they are paged in, and wavenumber compressed as they are paged out wavenumber. A working set of uncompressed pages are kept in memory, while most of the pages remain compressed and stored either in memory or on disk. (If stored on disk, pages may be combined to enhance I/O efficiency.) If the working set is large enough, and if our application has good locality of reference, the computation cost of compressing and/or decompressing each page will be amortized over the access of most of the samples within those pages.

SUMMING UP

The adaptation of the JPEG compression algorithm according to the invention enables much of that algorithm to be reused. The JPEG methods are reused for length-8 DCTs, by simply swapping the forward and inverse transforms. The JPEG quantization method is modified to avoid preferential treatment of low wavenumbers, and to handle block-to-block variations in data amplitudes. Sample values are also folded across block boundaries, before a forward DCT, and such values are unfolded after an inverse DCT. This folding and unfolding suppresses the blocking artifacts visible in images that have been compressed with the JPEG algorithm.

For comparing the performance of the method of the invention with other algorithms, two useful measures of performance are computation time and distortion, for a specified compression ratio. Preliminary benchmarks with an early implementation of the algorithm of the invention are encouraging. The computation times are roughly half and distortions almost identical to those for a wavelet-based algorithm, for a wide range of compression ratios (Diller 1997, personal communication). The computation times are believed to be lower for the method of the invention than for wavelet-based methods (due to fewer multiplies and adds, and more local use of memory).

What is claimed is:

1. A method for compressing samples of seismic exploration signals of subsurface formations, comprising the steps of:

(a) storing processed trace data of earth formations into a three dimensional block of seismic samples alone three ortholonal axes, (b) selecting a one-dimensional array x(j) of N of said seismic samples, where N is an integer and each sample x(j) represents a value of a seismic sample at sample j alone one of said axes, (c) partitioning said array x into blocks of M samples, where M is an integer representative of the number of samples of each block, where M<N, (d) folding the samples $x_l(j) \equiv x(lM+j)$ across each block boundary l, according to
$y_l(-j)=f(j)\ x_l(j)+f(-j)\ x_l(-j)$,
$y_l(-j)=f(j)\ x_l(-j)-f(-j)\ x_l(j)$,
$l=1,2,\ldots,N/M-1$,
$j=1,2,\ldots,M/2-1$,
$y_l(j)=x_l(j)$, otherwise, where, $$f(j) \equiv \sin\left[\frac{\pi}{4}\left(1+\frac{2j}{M}\right)\right],$$

(e) transforming the folded samples in each block of array y according to $$z(k) = \sum_{j=0}^{M-1} y(j)b(j)\sqrt{\frac{2}{M}}\cos\left[\frac{\pi(2k+l)j}{2M}\right],\ k=0,1,\ldots,M-1,$$

where $$b(j) \equiv \begin{cases} \frac{1}{\sqrt{2}}, & j=0 \\ 1, & \text{otherwise} \end{cases}$$

(f) quantizing the transformed samples in each block of array z to produce integers, (g) encoding said integers into a stream of bits representing the compressed array, and (h) storing said stream of bits as a compressed representation of said array.

2. The method of claim 1, applied to a multi-dimensional array, wherein the (c) block, (d) fold, and transform steps are applied as a cascade of operations along each array dimension.

3. The method of claim 2, wherein a subset of said multi-dimensional array is compressed.

4. The method of claim 1, further comprising decompressing said compressed array by inverting steps (a) through (e) in reverse order.

5. The method of claim 4, applied to a multi-dimensional array, wherein the inverse of the (a) block, (b) fold, and (c) transform steps are applied as a cascade of operations along each array dimension.

6. The method of claim 5, wherein a subset of said multi-dimensional array is decompressed.

* * * * *